United States Patent
Bhuwania et al.

(10) Patent No.: US 10,905,996 B2
(45) Date of Patent: Feb. 2, 2021

(54) SYSTEMS AND METHODS TO MANAGE HEAT IN AN INTEGRATED OIL AND GAS PROCESSING PLANT WITH SOUR GAS INJECTION

(71) Applicant: Chevron U.S.A. Inc., San Ramon, CA (US)

(72) Inventors: Nitesh Bhuwania, Richmond, CA (US); Shabbir Husain, Houston, TX (US); Daniel Chinn, Danville, CA (US); Ronald P. MacDonald, Mill Valley, CA (US); Tapan K. Das, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 147 days.

(21) Appl. No.: 15/972,256

(22) Filed: May 7, 2018

(65) Prior Publication Data

US 2019/0105602 A1    Apr. 11, 2019

Related U.S. Application Data

(60) Provisional application No. 62/569,709, filed on Oct. 9, 2017.

(51) Int. Cl.
*B01D 53/22*    (2006.01)
*B01D 53/14*    (2006.01)
(Continued)

(52) U.S. Cl.
CPC ....... *B01D 53/229* (2013.01); *B01D 53/1443* (2013.01); *B01D 53/1462* (2013.01);
(Continued)

(58) Field of Classification Search
CPC ............ B01D 53/1443; B01D 53/1462; B01D 53/1468; B01D 53/22; B01D 53/228; B01D 53/229; B01D 71/54; B01D 71/64; B01D 71/80; B01D 2257/304; B01D 2257/504; E21B 43/34; E21B 43/40
See application file for complete search history.

(56) References Cited

U.S. PATENT DOCUMENTS 6,053,965 A * 4/2000 Lokhandwala ...... B01D 53/229
                                                    95/49
6,630,011 B1 * 10/2003 Baker .................. B01D 53/225
                                                    95/47
(Continued)

*Primary Examiner* — Jason M Greene
(74) *Attorney, Agent, or Firm* — Jason M. Guerrero

(57) ABSTRACT

Disclosed are systems and methods for producing oil and gas while removing hydrogen sulfide from fluids produced from oil and gas reservoirs. Hydrogen sulfide-selective membranes are used to remove hydrogen sulfide from bottlenecked plant process steps including hydrogen sulfide removal. In some embodiments of the present disclosure, plant processing efficiency is improved for processing of high temperature associated gas streams by using membranes while integrating heat from other existing process streams. In other embodiments of the present disclosure, plant processing efficiency is improved for processing of high temperature associated gas streams by using high temperature tolerant polymer membranes. Oil and/or gas production is increased.

5 Claims, 3 Drawing Sheets

(51) Int. Cl.
*C01B 17/04* (2006.01)
*B01D 53/52* (2006.01)
*B01D 53/78* (2006.01)

(52) U.S. Cl.
CPC ..... *B01D 53/1468* (2013.01); *B01D 53/1493* (2013.01); *B01D 53/228* (2013.01); *B01D 53/52* (2013.01); *B01D 53/78* (2013.01); *C01B 17/0408* (2013.01); *B01D 2252/204* (2013.01); *B01D 2257/304* (2013.01)

(56) References Cited

U.S. PATENT DOCUMENTS

| | | | |
|---|---|---|---|
| 8,869,890 B2 | 10/2014 | Chinn et al. | |
| 2012/0168154 A1* | 7/2012 | Chinn | B01D 53/229 166/267 |
| 2016/0090910 A1* | 3/2016 | Ploeger | B01D 53/229 60/783 |
| 2018/0363978 A1 | 12/2018 | Ballaguet et al. | |

* cited by examiner

US 10,905,996 B2

SYSTEMS AND METHODS TO MANAGE HEAT IN AN INTEGRATED OIL AND GAS PROCESSING PLANT WITH SOUR GAS INJECTION

FIELD

The present disclosure relates generally to the field of producing oil and gas from oil and gas reservoirs while removing hydrogen sulfide from produced fluids produced from the oil and gas reservoirs and for injecting a sour gas stream containing the hydrogen sulfide into an underground formation. The present disclosure further relates to the use of high temperature tolerance membranes and process heat integration to maintain gas processing efficiency.

BACKGROUND

Production of fluids from oil and gas reservoirs containing high levels of hydrogen sulfide ($H_2S$) requires the separation of the $H_2S$ from both the produced oil and the produced natural gas and the safe disposal thereof. There are at least two widely practiced methods of processing natural gas with high $H_2S$. In one known method, the entire $H_2S$-containing natural gas stream (also referred to herein as sour gas) is dehydrated, compressed, and reinjected at high pressure in an underground formation. In another known method, the gas is sweetened in an amine unit using amine scrubbing, followed by dehydration and optionally fractionation to extract propane and butane prior to being sold as sales gas (containing mostly methane, ethane and some nitrogen). The $H_2S$ and $CO_2$ removed from gas processing in the amine unit (collectively referred to as acid gas) are sent to a Sulfur Recovery Unit (SRU) where the $H_2S$ is converted to elemental sulfur via the well-known Claus reaction. An additional tail-gas treating unit may provide further treatment to ensure that SOx emissions are minimal. For optimum operation of the gas processing plant unit operations, a temperature of above 60° C. is desired. This is because the first piece of equipment in a gas processing plant is often the inlet gas-oil separator, which requires sufficient temperature for flashing the light gases from the oil.

To process the oil phase from the produced fluids, after separation from the natural gas phase and water in one or more three-phase separators, the oil stream is often flashed in one or more stages to remove light components (including $H_2S$). Lastly, the oil is sent to a stabilizer column which further strips more light ends and $H_2S$ from the oil to meet a final vapor-pressure specification on the product oil. All the gases from the flash steps in the oil processing along with the stabilizer overhead gases may be combined, recompressed, and mixed with the sour gas. Some integrated facilities include parallel trains for oil production integrated with sour gas processing and sour gas injection.

There are some major challenges in the current art, where the inlet gas-oil-ratio (GOR) and % $H_2S$ in well production fields tend to increase over time as a reservoir ages and with prolonged sour gas injection. Often the facilities are designed with finite limits on $H_2S$ treating and sulfur conversion capacity along with sour gas injection capacity which can set limit for production.

U.S. Pat. No. 8,869,890 (Chinn et al.) introduced the concept of employing membranes to debottleneck oil and gas processing. However, one of the challenges associated with some current commercial membranes in the art is meeting the gas temperature needed for the optimum membrane separation performance. For membranes based on polymeric material like cellulose acetate and cellulose triacetate, operating temperatures beyond 50-60° C. result in a significant decrease in separation efficiency. It would be desirable to find ways to avoid this decrease in separation efficiency.

SUMMARY

In one aspect, a system is provided for increasing oil and/or gas production in an oil and gas production plant including hydrogen sulfide removal. The system includes a separator for separating produced fluid from a subterranean reservoir into an associated gas stream containing 1-50% hydrogen sulfide by volume, a water stream and an oil stream; an associated gas compressor for compressing a first portion of the associated gas stream to form a first compressed associated gas stream; and a hydrogen sulfide-selective membrane downstream of the associated gas compressor to remove hydrogen sulfide from the first portion of the associated gas stream and form a permeate stream enriched in hydrogen sulfide and a retentate stream depleted in hydrogen sulfide and enriched in hydrocarbon gases at a temperature of from 85° C. to 95° C. the hydrogen sulfide-selective membrane comprises a polymer selected from the group consisting of polyimides, polyether block amide (PEBA, e.g., Pebax® available from Arkema Inc., King of Prussia, Pa.) and polyurethanes. The system further includes a gas processing plant for receiving a feed gas stream comprising the retentate stream and a portion of the oil stream from the separator. The gas processing plant includes an amine unit for removing hydrogen sulfide from the feed gas stream and producing a hydrogen sulfide-enriched stream and a hydrocarbon-enriched stream. The system further includes a Claus unit for converting the hydrogen sulfide in the hydrogen sulfide-enriched stream into elemental sulfur.

In another aspect, a system is provided for increasing oil and/or gas production in an oil and gas production plant including hydrogen sulfide removal that includes a separator for separating produced fluid from a subterranean reservoir into an associated gas stream containing 1-50% hydrogen sulfide by volume, a water stream and an oil stream; an associated gas compressor for compressing a first portion of the associated gas stream to form a first compressed associated gas stream; a hydrogen sulfide-selective membrane downstream of the associated gas compressor to remove hydrogen sulfide from the first portion of the associated gas stream and form a permeate stream enriched in hydrogen sulfide and a retentate stream depleted in hydrogen sulfide and enriched in hydrocarbon gases; a cross heat exchanger for receiving a discharge stream from the associated gas compressor and the retentate stream thereby forming a warmer retentate stream and a cooler discharge stream; and a gas processing plant for receiving a feed gas stream comprising the warmer retentate stream and a portion of the oil stream from the separator. The gas processing plant includes an amine unit for removing hydrogen sulfide from the feed gas stream and producing a hydrogen sulfide-enriched stream and a hydrocarbon-enriched stream. The system further includes a Claus unit for converting the hydrogen sulfide in the hydrogen sulfide-enriched stream into elemental sulfur.

In another aspect, a method is provided for increasing oil and/or gas production in an oil and gas production plant including hydrogen sulfide removal that includes separating produced fluid from a subterranean reservoir into an associated gas stream containing 1-50% hydrogen sulfide by volume, a water stream and an oil stream; compressing a first portion of the associated gas stream to form a first compressed associated gas stream; and removing hydrogen sulfide from the first portion of the associated gas stream and forming a permeate stream enriched in hydrogen sulfide and a retentate stream depleted in hydrogen sulfide and enriched in hydrocarbon gases in a hydrogen sulfide-selective membrane. In a cross heat exchanger, a discharge stream from the associated gas compressor and the retentate stream are received, and a warmer retentate stream and a cooler discharge stream are formed. In a gas processing plant, a feed gas stream comprising the warmer retentate stream and a portion of the oil stream from the separator are received. The gas processing plant includes an amine unit for removing hydrogen sulfide from the feed gas stream and producing a hydrogen sulfide-enriched stream and a hydrocarbon enriched stream, and a Claus unit for converting the hydrogen sulfide in the hydrogen sulfide-enriched stream into elemental sulfur.

In another aspect, a method is provided for retrofitting an oil and gas production plant comprising a separator for separating produced fluid from a subterranean reservoir into an associated gas stream containing 1-50% hydrogen sulfide by volume, a water stream and an oil stream; an associated gas compressor for compressing a first portion of the associated gas stream to form a first compressed associated gas stream; a hydrogen sulfide-selective membrane downstream of the associated gas compressor to remove hydrogen sulfide from the first portion of the associated gas stream and form a permeate stream enriched in hydrogen sulfide and a retentate stream depleted in hydrogen sulfide and enriched in hydrocarbon gases; and a gas processing plant for receiving a feed gas stream comprising the retentate stream and a portion of the oil stream from the separator, wherein the gas processing plant includes an amine unit for removing hydrogen sulfide from the feed gas stream and producing a hydrogen sulfide stream and a hydrocarbon enriched stream; and a Claus unit for converting the hydrogen sulfide in the hydrogen sulfide-enriched stream into elemental sulfur. The method of retrofitting includes adding a cross heat exchanger for receiving a discharge stream from the associated gas compressor and the retentate stream thereby forming a warmer retentate stream and a cooler discharge stream; feeding the warmer retentate stream and a portion of the oil stream from the separator to the gas processing plant; and feeding the cooler discharge stream to the hydrogen sulfide-selective membrane.

BRIEF DESCRIPTION OF THE DRAWINGS

These and other objects, features and advantages of the present invention will become better understood referring to the following description and accompanying drawings. The drawings are not considered limiting of the scope of the disclosure. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1:
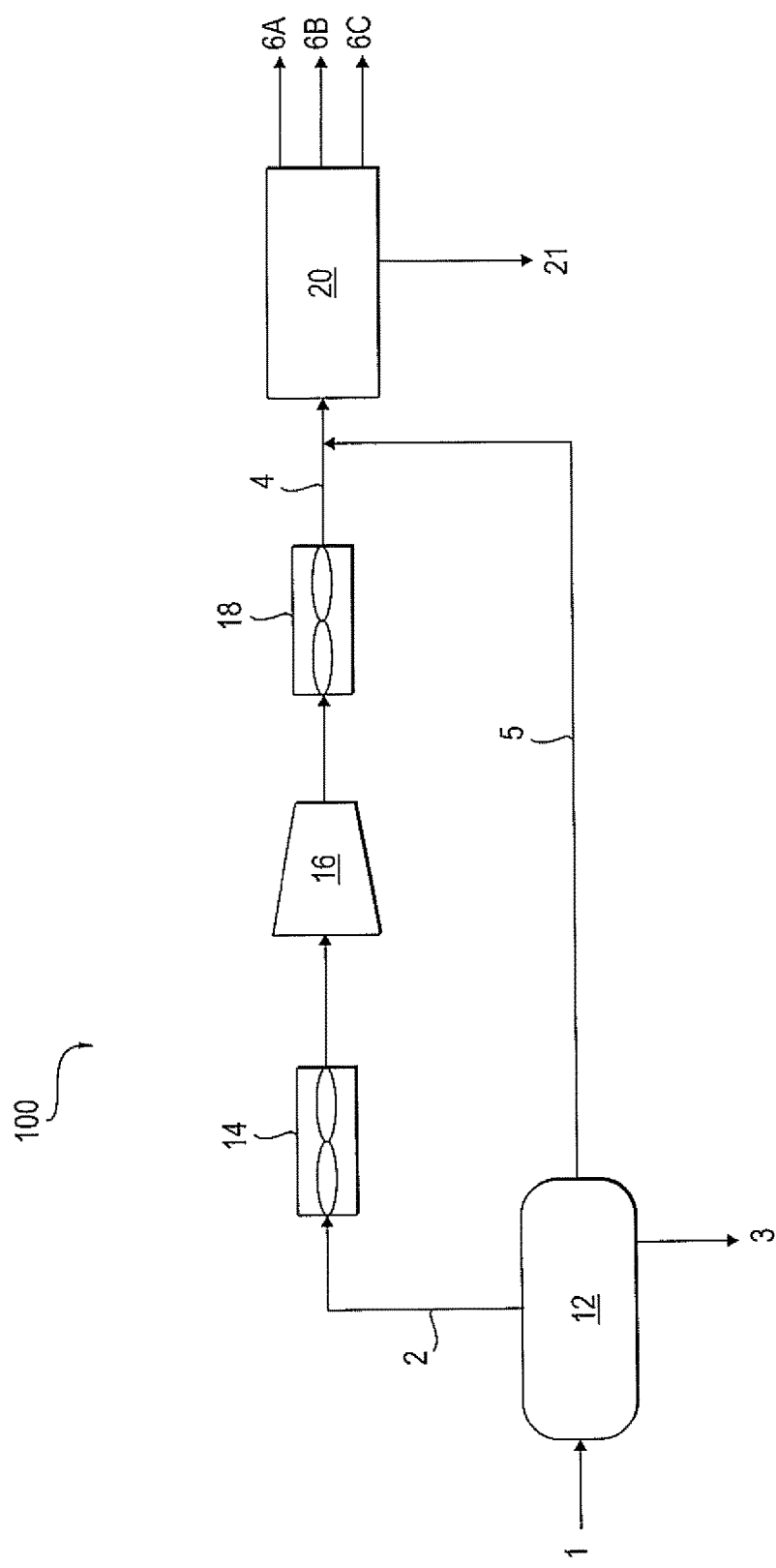
FIG. 1 shows a schematic diagram of a plant for oil and gas processing in accordance with the prior art.

In one embodiment, fluids from one or more oil and gas reservoirs feed facilities that process sour gas and produce oil and sweet gas. The reservoirs may have been producing for many years and may have experienced a rapid loss in reservoir pressure and increased GOR. For this reason, pressure boosting by compression is required. Referring to FIG. 1, a schematic diagram of a plant 100 that is currently practiced in the art is shown. A feed stream 1 of produced fluids from at least one reservoir (not shown) is fed to a separator 12 for separating produced fluids from the reservoir into associated gas 2, water 3 and crude oil 5 streams, the associated gas stream 2 containing at least 1 to 50 vol % hydrogen sulfide. Separator 12 may be any of a few different types of equipment for separating the fluids such as a water/gas/crude oil separator. As is well known to those skilled in the art of hydrocarbon production, equipment in separator 12 may include by way of example and not limitation single or multi-stage separators, free water knock-out tanks, oil stabilization columns, gunbarrel or oil settling tanks, control valves (pressure, level, temperature, flow), compressors, pumps, stock tanks, water skimmers etc.

The water phase or stream 3 is removed from the separator 12 for further processing or disposal (not shown). The water 3 may be injected in a subterranean formation for either disposal or to assist in the pressure maintenance of a reservoir. Or else, the water may be further treated to remove contaminants such as dispersed oil, dissolved or soluble organic components, treatment chemicals (biocides, reverse emulsion breakers, corrosion inhibitors), produced solids (sand, silt, carbonates, clays, corrosion products), scales, bacterial, metals (iron, manganese, etc.), salts, and NORM (naturally occurring radioactive material), sodium content, and boron content such that the water may be suitable for irrigation. Or if even further treated, the water may be turned into potable water suitable for consumption by humans and animals. Other non-limiting uses of the separated and treated water might include boiler feed water for steam generation.

The associated gas stream 2 is removed overhead from the separator and fed to an air cooler 14. Associated gas 2 typically has a composition, by way of example and not limitation, including water, carbon dioxide, hydrogen sulfide, nitrogen, methane, ethane, propane, normal and iso-butane, normal and iso-pentane, normal and iso hexane, etc. Associated gas 2 from the air cooler 14 is then fed to a pressure boost compressor 16. Compressed associated gas is then cooled in a second air cooler 18. Stream 4 has a temperature suitable for feeding to a gas processing plant 20. In one embodiment, the temperature of stream 4 is at least 60° C. The desired temperature in stream 4 is achieved by controlling the air-cooler temperature 18.

The gas processing plant 20 includes one or more sulfur removal units that may include an amine unit including at least two vessels (amine absorber and regenerator) and a Claus unit. Associated gas 4 and oil 5 are sent to the inlet separator of plant 20 (not shown). The sour gas leaving the separator of plant 20 can be sent to an amine unit (not shown) where acid gases, such as $H_2S$ and $CO_2$, are stripped from the sour gas stream thus producing an enriched acid gas stream and an enriched hydrocarbon stream. As a non-limiting example, the acid gas stream may include a small amount of hydrocarbons, typically methane ($C_1$), water vapor, carbon dioxide ($CO_2$), and hydrogen sulfide ($H_2S$). Acid gas stream is then sent to a Claus unit (not shown) which is well known to those skilled in the art of treating acid gases that include relative high concentrations of hydrogen sulfide ($H_2S$). The Claus unit may convert at least a portion of the $H_2S$ into elemental sulfur, which may be subsequently transported and sold for commercial uses like fertilizer and sulfuric acid. The final products leaving the gas processing plant are 6A (sweet gas), 6B (LPG), and 6C (sulfur).

The gas processing plant 20 further includes oil processing (not shown). In the oil processing, gases are removed from the oil 5 by flashing in one or more gas-oil separator vessels (not shown) operating at successively lower pressures. Associated gases from the overhead of each separator vessels may be recompressed in one or more wet gas compressors, cooled, and combined to a single stream for further processing. The oil is then it is further treated to become stabilized oil such as by using a conventional stabilizer column (not shown) to produce stabilized oil 21. Stabilized oil 21 refers to a hydrocarbon product that is generally ready for transport to a refinery for further processing into desired products such as naphtha, gasoline, diesel, etc, and generally refers to oil that is substantially free of dissolved hydrocarbons gases. Such oil may be stored in a vented tank at atmospheric pressure or transported through a pipeline. Actual specifications for stabilized oil may vary but often the stabilized oil has a Reid Vapor Pressure (RVP) of 10-12 psia. $H_2S$ specification may vary. However, by way of example and not limitation, $H_2S$ content may be on the order of 10-60 parts per million.

The gas processing plant 20 can further include a dehydration unit, deethanizer column, followed by a depropanizer column, and then a debutanizer column (not shown) where hydrocarbons in the associated gas stream 2 are separated into different saleable products. These separated gases typically include sales gases, which comprise methane, ethane, nitrogen, with small amounts of propane and higher hydrocarbons. Also, a liquefied petroleum gas stream including LPG ($C_3$, $C_4$) is typically separated out. A stream of heavier gases ($C_4+$) is also separated out by gas processing plant 20. Fluids of $C_4+$ are often liquid at ambient conditions (20° C., 1 atmosphere). This liquid stream can be combined with crude oil and sent to the stabilizer column to produce the stabilized stream 21 of crude oil that is suitable for transport, as described above. The gas processing plant 20 can also include an inlet three-phase separator, a condensate stabilizer, a tail gas treating unit and sweet gas fractionation (not shown).

In some embodiments of the present disclosure, plant processing efficiency is improved for processing of high temperature associated gas streams (>60° C.) by using membranes while integrating heat from other existing process streams. In other embodiments of the present disclosure, plant processing efficiency is improved for processing of high temperature associated gas streams by using rubbery or polyimide polymer membranes which can handle the high temperatures.

Figure 2:
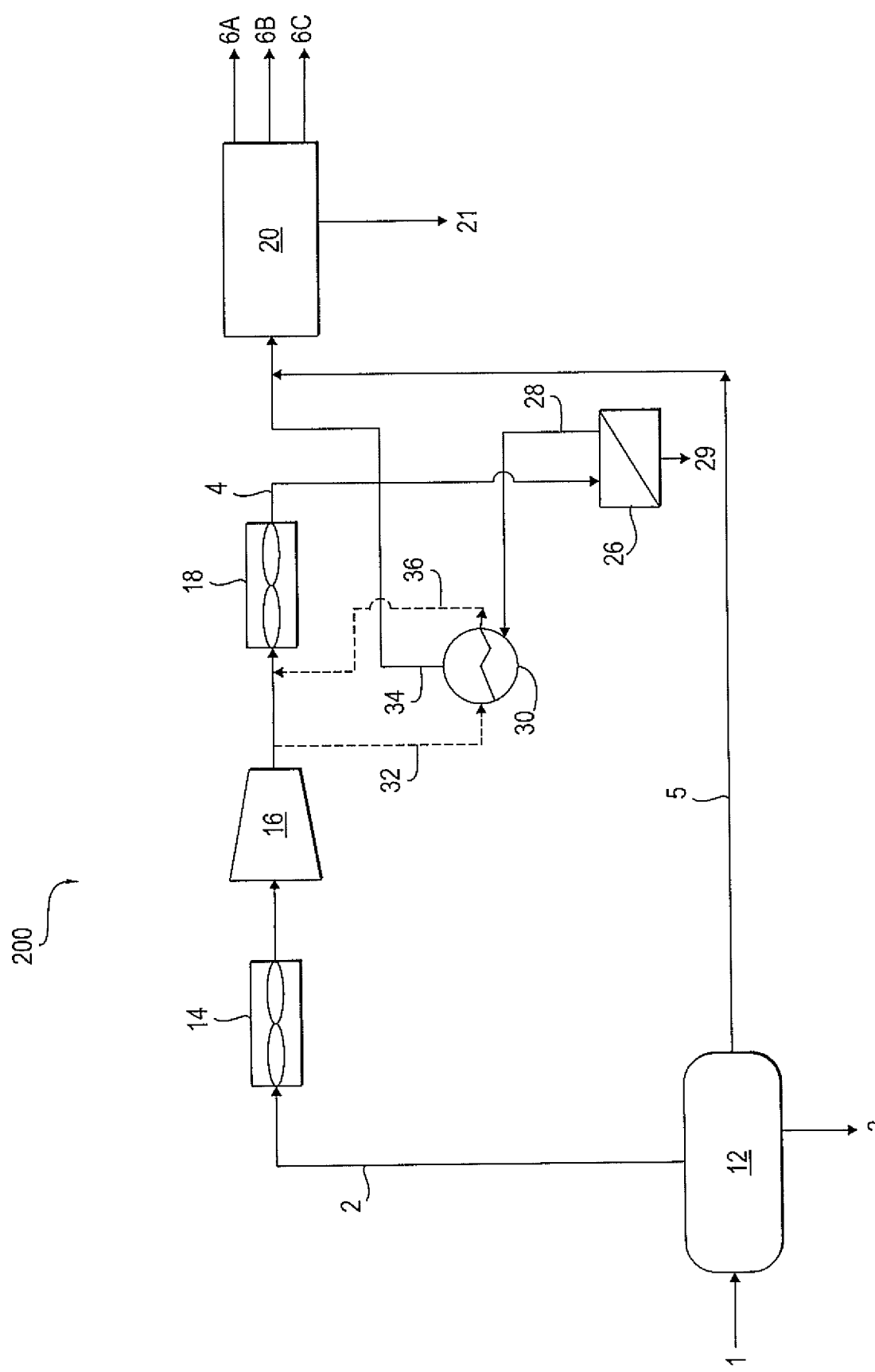
FIG. 2 shows a schematic diagram of a plant for oil and gas processing in accordance with certain example embodiments.

FIG. 2 shows a retrofitted production facility 200 according to one embodiment. Alternatively, production facility 200 could be a new production unit that is initially built including membranes for the separation of acid gases from associated gases. Referring to FIG. 2, in one embodiment, a $H_2S$-selective membrane 26 is located downstream of the air cooler 18 and downstream of the pressure boost compressor 16. The membrane 26 separates the membrane feed stream 4 into a permeate stream 29 enriched in hydrogen sulfide and carbon dioxide and a retentate stream 28 depleted in hydrogen sulfide and carbon dioxide but enriched in hydrocarbon gases. The gas fed to the membrane 26 has a temperature of from 35 to 50° C., even from 35 to 45° C. In one embodiment, the membrane retentate stream 28 from the membrane 26 is then passed to an inlet (tube-side inlet) of a cross heat exchanger 30. Hot stream 32 from the compressor 16 is passed to another inlet (shell-side inlet) of the cross heat exchanger 30 for transfer of heat from hot stream 32 to cool retentate stream 28 (thus heating retentate stream 28), thus forming a warmer retentate stream 34 and a cooler discharge stream 36. Hot stream 32 from the compressor 16 can have a temperature, e.g., of 160° C. Stream 34, exiting the heat exchanger 30 (tube-side outlet) and heated to, e.g., 75° C., is then fed to the gas processing plant 20 for further processing.

Having lower feed temperatures to membrane 26 helps in obtaining better separation efficiency/selectivity from the membrane 26. This is particularly true for cellulosic membranes. Hence, the cooler discharge stream 36 from (shell-side outlet) at e.g., 119° C. is returned to the air cooler 18 where it is further cooled to, for example, 31° C. before being fed to the membrane 26. The exact temperature of stream 34 going into the plant 20 will depend on the warm stream coming out of the shell side of heat exchanger 30.

The advantages of the membrane 26 integrated with heat exchanger 30 are twofold. For one thing, plant 20 is debottlenecked as feed temperature to plant 20 is preferably greater than 60° C. For another thing, membranes operating at 35° C. is desired to get better separation selectivity and thus drive better product recovery and $H_2S$ removal. By decreasing the $H_2S$ concentration of the feed gas going to Plant 20's amine unit (not shown) and SRU (not shown) more gas and oil can be produced by increasing the total flowrate of feed stream 1 until Plant 20's amine unit and SRU units are fully utilized.

In one embodiment, the removal of the hydrogen sulfide and carbon dioxide from the associated gas 4 by the membrane 26 allows the amine unit of the gas processing plant 20 to process a greater quantity of associated gases than if the hydrogen sulfide and carbon dioxide had not been removed by the membrane 26. Since the feed to the gas processing plant 20 has a reduced level of hydrogen sulfide, it is possible to increase the feed flowrate until the $H_2S$ capacity of the amine unit are SRU are reached. Thus, it has been found to be possible to increase sweet gas production of the overall plant by up to 40%, even by 10-30% by mass. It has likewise been found to be possible to increase oil production of the overall plant by up to 20%, even by 5-15% by mass.

In this embodiment, the $H_2S$-selective membrane 26 may be any polymeric membrane known for use in membranes, including but not limited to cellulose acetate, cellulose triacetate, polyimide, or rubbery membranes such as polyether block amide (PEBA) and polyurethanes that preferentially permeates $H_2S$ over hydrocarbons such as methane, ethane, propane and butane. Preferably the membranes have a mixed-gas $H_2S/CH_4$ selectivity of 10 or greater when measured at 35° C. and 300 psig feed. In another embodiment, the selectivity is at least 20. In yet another embodiment, the selectivity is at least 40. Also, ideally, the $H_2S$ permeance is 0.4-times or greater than the $CO_2$ permeance when measured at 35° C. and 300 psig feed. In another embodiment, the $H_2S$ permeance is greater than 0.6 times the $CO_2$ permeance. And in yet another embodiment, the $H_2S$ permeance is greater than 0.9 times the $CO_2$ permeance. With respect to the form of the membrane, by way of example and not limitation, the form of the membrane may be a hollow fiber or spiral wound. Those skilled in the art of membrane separation of gases will appreciate that other configuration of membranes may be used to separate gases.

Table 1 shows some exemplary data of a lab-scale membrane exhibiting preferential selectivity of $H_2S$ and $CO_2$ over methane. This membrane is similar to those disclosed in US Pat. Publication No. 2010/0186586A1, and U.S. Pat. Nos. 6,932,859B2, and 7,247,191B2.

TABLE 1

Gas Separation Using 6fda:Dam:Daba (3:2) Crosslinked Membrane

| FEED | Temp (deg C.) | Feed (psig) | Permeance CH4 (GPU) | Permeance $CO_2$ (GPU) | Permeance $H_2S$ (GPU) |
|---|---|---|---|---|---|
| Pure Gas CH4 | 35 | 300 | 1.2 | 55 | N/A |
| and Pure Gas | 38 | 905 | 0.55 | 13 | 5.6 |
| $CO_2$ 4.1% $H_2S$, | 38 | 300 | 0.85 | 22 | 13 |
| 21% C02 74.9% | 38 | 605 | 0.71 | 17 | 10 |
| CH4 20.5% | 54 | 300 | 0.98 | 22 | 12 |
| $H_2S$, 3.9% | 54 | 575 | 0.87 | 18 | 10 |
| $CO_2$, and | | | | | |
| 75.6% CH4 | | | | | |

Figure 3:
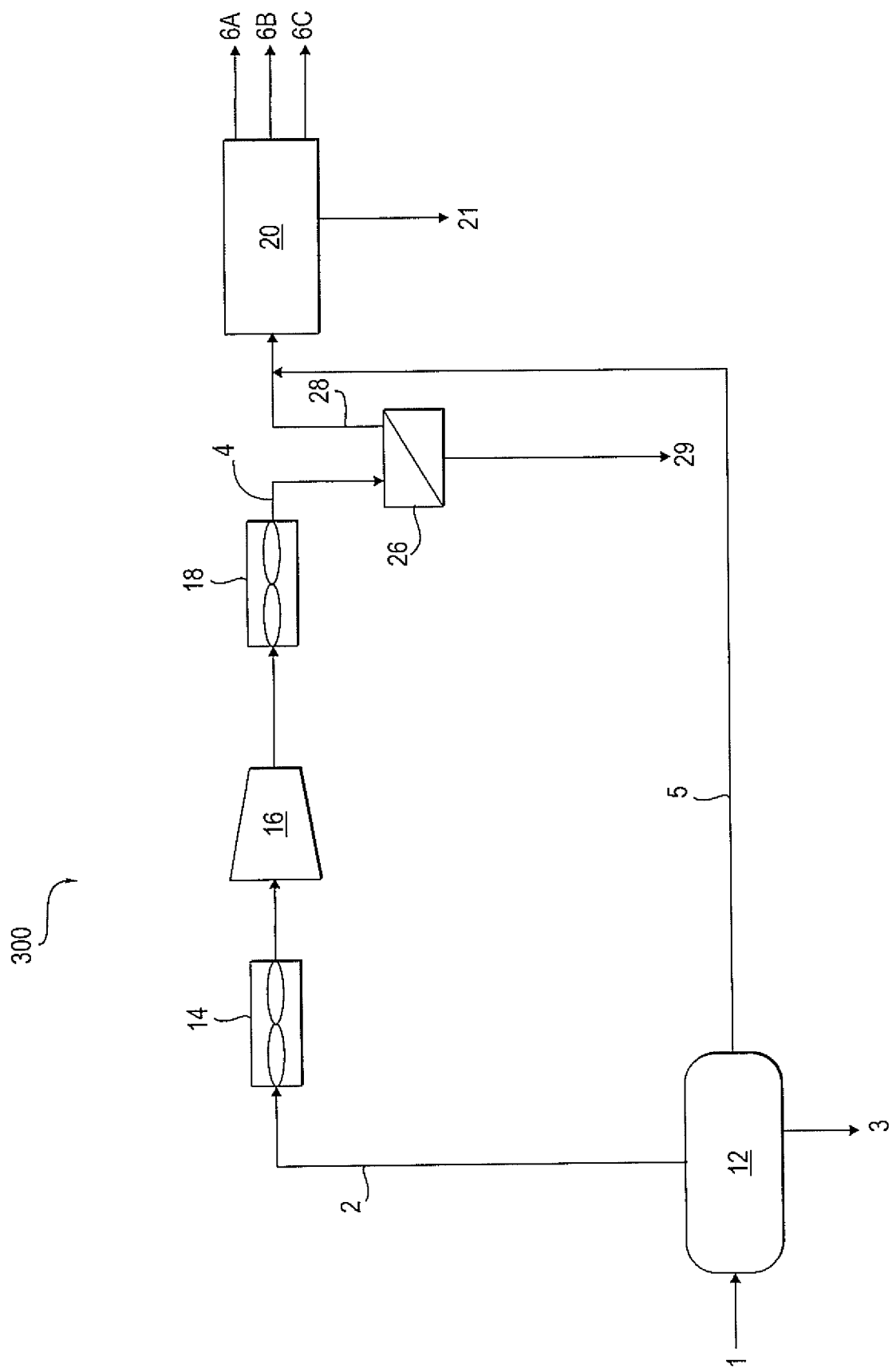
FIG. 3 shows a schematic diagram of a plant for oil and gas processing in accordance with certain example embodiments.

Modules have 3 fibers, 260 micron 00, 12.5 cm L (effective area = 3.06 cm2).
Shell-side feed, Permeate pressure = 0 psig, Stage Cut <1.2%, Feed Flow: 244-256 scc/min FIG. 3 shows a retrofitted production facility 300 according to another embodiment. Alternatively, production facility 300 could be a new production unit that is initially built including membranes for the separation of acid gases from associated gases. Referring to FIG. 3, in one embodiment, a $H_2S$-selective membrane 26 is located downstream of the air cooler 18 and downstream of the pressure boost compressor 16. The membrane 26 separates the membrane feed stream 4 into a permeate stream 29 enriched in hydrogen sulfide and carbon dioxide and a retentate stream 28 depleted in hydrogen sulfide and carbon dioxide but enriched in hydrocarbon gases. The gas fed to the membrane 26 can have a temperature greater than 60° C., even as high as 90° C. In this embodiment, the $H_2S$-selective membrane 26 is a high-temperature tolerant membrane. Suitable high-temperature tolerant membranes include some rubbery membranes such as polyether block amide (e.g. Pebax® available from Arkema Inc., King of Prussia, Pa.) and polyurethanes that preferentially permeates $H_2S$ over hydrocarbons such as methane, ethane, propane and butane, or polyimide membranes. Here for illustration, the stream from the compressor 16 can be at 160° C. and can be cooled down to 90° C. (stream 4 after cooler 18). Stream 4 feeds into the membrane 26 which can tolerate higher temperatures and provide a product/retentate stream 28 at 86° C., where the high temperature is desirable to the downstream plant 20. Depending on the temperature required by Plant 20, the feed temperature of the membranes' retentate stream 28 may be controlled by the setting on air cooler 18.

In one embodiment, the plant 100 shown in FIG. 1 can be retrofit to obtain the plant 200 shown in FIG. 2. In order to accomplish the retrofit, line 4 is disconnected downstream of air cooler 18 downstream of the pressure boost compressor 16 and reconnected to the inlet of the membrane 26. The retentate outlet of the membrane 26 is connected to an inlet of the cross heat exchanger 30. A discharge stream from compressor 16 is connected to another inlet of the cross heat exchanger 30. A warmer retentate stream outlet of the cross heat exchanger 30 is connected to an inlet of the gas processing plant. A cooler discharge stream outlet of the cross heat exchanger 30 is connected to an inlet of air cooler 18.

In one embodiment, the plant 100 shown in FIG. 1 can be retrofit to obtain the plant 300 shown in FIG. 3. In order to accomplish the retrofit, line 4 is disconnected downstream of air cooler 18 downstream of the pressure boost compressor 16 and reconnected to the inlet of a high-temperature tolerant membrane 26. The retentate outlet of the membrane 26 is connected to an inlet of the gas processing plant 20.

It should be noted that only the components relevant to the disclosure are shown in the figures, and that many other components normally part of a gas processing, an oil processing and/or a gas injection system are not shown for simplicity. From the above description, those skilled in the art will perceive improvements, changes and modifications, which are intended to be covered by the appended claims.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:
1. A system for increasing oil and/or gas production in an oil and gas production plant including hydrogen sulfide removal, comprising:
   a. a separator for separating produced fluid from a subterranean reservoir into an associated gas stream containing 1-50% hydrogen sulfide by volume, a water stream and an oil stream;
   b. an associated gas compressor for compressing a first portion of the associated gas stream to form a first compressed associated gas stream;
   c. a hydrogen sulfide-selective membrane downstream of the associated gas compressor to remove hydrogen sulfide from the first portion of the associated gas stream and form a permeate stream enriched in hydrogen sulfide and a retentate stream depleted in hydrogen sulfide and enriched in hydrocarbon gases at a temperature of from 85° C. to 95° C.; wherein the hydrogen sulfide-selective membrane comprises a polymer selected from the group consisting of polyimides, polyether block amide (PEBA) and polyurethanes; and
   d. a gas processing plant for receiving a feed gas stream comprising the retentate stream and a portion of the oil stream from the separator, wherein the gas processing plant includes an amine unit for removing hydrogen sulfide from the feed gas stream and producing a hydrogen sulfide-enriched stream and a hydrocarbon- enriched stream; and a Claus unit for converting the hydrogen sulfide in the hydrogen sulfide-enriched stream into elemental sulfur.

2. A system for increasing oil and/or gas production in an oil and gas production plant including hydrogen sulfide removal, comprising:
   a. a separator for separating produced fluid from a subterranean reservoir into an associated gas stream containing 1-50% hydrogen sulfide by volume, a water stream and an oil stream;
   b. an associated gas compressor for compressing a first portion of the associated gas stream to form a first compressed associated gas stream;
   c. a hydrogen sulfide-selective membrane downstream of the associated gas compressor to remove hydrogen sulfide from the first portion of the associated gas stream and form a permeate stream enriched in hydrogen sulfide and a retentate stream depleted in hydrogen sulfide and enriched in hydrocarbon gases;
   d. a cross heat exchanger for receiving a discharge stream from the associated gas compressor and the retentate stream thereby forming a warmer retentate stream and a cooler discharge stream; and
   e. a gas processing plant for receiving a feed gas stream comprising the warmer retentate stream and a portion of the oil stream from the separator, wherein the gas processing plant includes an amine unit for removing hydrogen sulfide from the feed gas stream and producing a hydrogen sulfide-enriched stream and a hydrocarbon-enriched stream; and a Claus unit for converting the hydrogen sulfide in the hydrogen sulfide-enriched stream into elemental sulfur.

3. A method for increasing oil and/or gas production in an oil and gas production plant including hydrogen sulfide removal, comprising:
   a. separating produced fluid from a subterranean reservoir into an associated gas stream containing 1-50% hydrogen sulfide by volume, a water stream and an oil stream in a separator;
   b. compressing a first portion of the associated gas stream to form a first compressed associated gas stream in an associated gas compressor;
   c. removing hydrogen sulfide from the first portion of the associated gas stream and forming a permeate stream enriched in hydrogen sulfide and a retentate stream depleted in hydrogen sulfide and enriched in hydrocarbon gases in a hydrogen sulfide-selective membrane downstream of the associated gas compressor;
   d. in a cross heat exchanger, receiving a discharge stream from the associated gas compressor and the retentate stream and forming a warmer retentate stream and a cooler discharge stream; and
   e. in a gas processing plant, receiving a feed gas stream comprising the warmer retentate stream and a portion of the oil stream from the separator, wherein the gas processing plant includes an amine unit for removing hydrogen sulfide from the feed gas stream and producing a hydrogen sulfide-enriched stream and a hydrocarbon enriched stream; and a Claus unit for converting the hydrogen sulfide in the hydrogen sulfide-enriched stream into elemental sulfur.

4. A method of retrofitting an oil and gas production plant comprising a separator for separating produced fluid from a subterranean reservoir into an associated gas stream containing 1-50% hydrogen sulfide by volume, a water stream and an oil stream; an associated gas compressor for compressing a first portion of the associated gas stream to form a first compressed associated gas stream; a hydrogen sulfide-selective membrane downstream of the associated gas compressor to remove hydrogen sulfide from the first portion of the associated gas stream and form a permeate stream enriched in hydrogen sulfide and a retentate stream depleted in hydrogen sulfide and enriched in hydrocarbon gases; and a gas processing plant for receiving a feed gas stream comprising the retentate stream and a portion of the oil stream from the separator, wherein the gas processing plant includes an amine unit for removing hydrogen sulfide from the feed gas stream and producing a hydrogen sulfide stream and a hydrocarbon enriched stream; and a Claus unit for converting the hydrogen sulfide in the hydrogen sulfide-enriched stream into elemental sulfur, the method of retrofitting comprising:
   adding a cross heat exchanger for receiving a discharge stream from the associated gas compressor and the retentate stream thereby forming a warmer retentate stream and a cooler discharge stream;
   feeding the warmer retentate stream and a portion of the oil stream from the separator to the gas processing plant; and
   feeding the cooler discharge stream to the hydrogen sulfide-selective membrane.

5. The method of claim 4 wherein the oil and gas production plant has an increased oil and/or gas production rate as compared with the oil and gas production plant without the cross heat exchanger.

* * * * *